United States Patent [19]
Roll et al.

[11] Patent Number: 6,043,350
[45] Date of Patent: Mar. 28, 2000

[54] BONDING AGENT COMPOSITION, ITS USE AS WELL AS A PROCESS FOR THE PRODUCTION OF PARTICLE BOARD

[75] Inventors: Willi Roll, Altenberge, Germany; Antonio Pizzi, Chantraine, France; Peter Stracke, Iserlohn, Germany

[73] Assignee: Bakelite AG, Germany

[21] Appl. No.: 09/119,432

[22] Filed: Jul. 20, 1998

[30] Foreign Application Priority Data

Aug. 6, 1997 [DE] Germany .............. 197 33 925

[51] Int. Cl.[7] .............. C08G 8/20; C08L 61/12; C09J 161/12
[52] U.S. Cl. .............. 536/4.1; 528/1; 528/230; 528/271
[58] Field of Search .............. 536/4.1; 528/1, 528/230, 271

[56] References Cited

FOREIGN PATENT DOCUMENTS

| 0639608 | 2/1995 | European Pat. Off. . |
| 0648807 | 4/1995 | European Pat. Off. . |
| 1907251 | 6/1970 | Germany . |
| 4402341 | 8/1995 | Germany . |
| 1183838 | 3/1970 | United Kingdom . |

*Primary Examiner*—Nathan M. Nutter
*Attorney, Agent, or Firm*—Bierman, Muserlian and Lucas

[57] ABSTRACT

The bonding agent composition comprises tannin of pine bark and/or pecan nut, paraformaldehyde and an ammonium salt of a weak acid. It serves inter alia as bonding agent for particle board with high transverse tensile strength, good water resistance and low formaldehyde emission.

8 Claims, No Drawings

BONDING AGENT COMPOSITION, ITS USE AS WELL AS A PROCESS FOR THE PRODUCTION OF PARTICLE BOARD

The invention relates to a bonding agent composition which can be heat cured, is compatible with wood and other cellulose-containing products, and which is suitable for the production of derived timber products, in particular of particle board.

Within the scope of searching for natural and, in particular, renewable raw materials for the production of bonding agents for derived timber products the use of tannins is also known.

EP-A 0 639 608 describes, for example, heat curing bonding agents based on tannins of pecan nut or pine bark and hexamethylene tetramine. These bonding agents have the disadvantage that after storage in water their strength and, consequently, also their swelling in thickness, is not satisfactory.

Better results with these two properties are obtained if the tannin is cured with paraformaldehyde. Curing of tannins, in particular of tannin from the bark extract of pinus brutia, with paraformaldehyde for the production of primary gluing is known from "Holz als Roh- und Werkstoff", Vol. 40 (1982), pp. 13–18.

This curing, however, has the disadvantage that the formaldehyde emission from the cured derived timber products is too high. Even by adding the formaldehyde trap urea in quantities at which the mechanical characteristics are still retained, to such bonding agents, the formaldehyde emission cannot be decreased to acceptable values below 1.5 mg/100 g.

It is therefore the task of the invention to describe a bonding agent composition based on tannin for the production of derived timber products, in particular of particle board, which, compared to the bonding agent known from EP-A 0 639 608, has improved values with respect to the thickness swelling and the wet transverse tensile strength at which the products produced with them have a significantly reduced formaldehyde emission.

It has been found that a derived timber product produced with a bonding agent composition comprising tannin of pine bark and/or pecan nut, paraformaldehyde and an ammonium salt of a weak acid, after water storage has improved swelling in thickness and transverse tensile strength compared to a derived timber product produced analogously, which comprises as the bonding agent tannin of pine bark and/or of pecan nut and hexamethylene tetramine. But such derived timber product produced with a bonding agent composition according to the invention shows surprisingly a very low formaldehyde emission and therefore meets also the requirements for indoor application.

The bonding agent composition according to the invention therefore comprises tannin of pine bark (pinus radiata) and/or of pecan nut, paraformaldehyde, and an ammonium salt of a weak acid.

These tannins from the group of procyanidines and prodelphinidines are commercially available products and have until now been used primarily as tanning material. The commercial grade is sufficient for the use according to the invention. Mixtures of these tannins with, for example, mimosa and/or quebracho tannin in a ratio 2:5 to 5:2, while having a prolonged curing time, can still be used.

The curing agents in this bonding agent composition is paraformaldehyde of commercial grade.

According to the invention the reduction of the formaldehyde emission is attained through the addition of an ammonium salt of a weak acid.

Weak acids, within the scope of this invention, are inorganic and organic acids with a pK value >3.

Examples of corresponding ammonium salts are ammonium borate, acetate, lactate, benzoate, adipate, alkali and alkaline earth ammonium phosphate, but not, however, ammonium carbonate or hydrogencarbonate.

The bonding agent compositions according to the invention comprise the individual components in the following quantitative ratios:

| | |
|---|---|
| Tannin | 70 to 93 wt % |
| Paraformaldehyde | 3 to 10 wt % |
| Ammonium salt | 4 to 20 wt % |

These bonding agent compositions are suitable as bonding agents for the production of bonded cellulose-containing products, such as for example of derived timber products or cellulose-containing insulation materials such as textile fleece or sound and heat insulation boards, but in particular for the production of particle board.

This production of particle boards is accomplished in a manner known per se. The dry chips are sprayed with an aqueous solution of the bonding agent composition according to the invention, molded while being shaped, and cured at a pressure in the range from 0.1 to 4 MPa and a temperature in the range from 140 to 230° C.

EXAMPLES

Pine wood chips are each sprayed with a 40% bonding agent solution. They subsequently comprise 12% solid resin each.

They are subsequently shaped in a manner known per se (2.5 N/mm$^2$; 220° C.) into boards having the dimensions 500×500×20 mm, molded and cured (13 s/mm). Subsequently the density is determined, the transverse tensile strength of the boards a) dry and b) after wet storage (V 100) as well as the swelling in thickness after 24 hours of storage in water at 20° C. and the formaldehyde emission (determined according to ENRO, perforator method).

The following bonding agent compositions were used:

Example 1 (Comparison Example)
90 wt % tannin of pine bark (pinus radiata)
5 wt % urea
5 wt % paraformaldehyde Example 2 (Comparison Example)
94 wt % tannin of pine bark (pinus radiata)
6 wt % hexamethylene tetramine Example 3
81 wt % tannin of pine bark (pinus radiata)
12 wt % ammonium acetate
7 wt % paraformaldehyde The following Table shows the results obtained with the single layer plates:

| | Example 1 | Example 2 | Example 3 |
|---|---|---|---|
| Density [kg.m$^3$] | 729 | 723 | 706 |
| Transverse tensile strength [N/mm$^2$] dry | 0.73 | 0.61 | 0.55 |

-continued

|  | Example 1 | Example 2 | Example 3 |
|---|---|---|---|
| Transverse tensile strength [N/mm²] after storage in water | 0.13 | 0.10 | 0.12 |
| Swelling in thickness [%] | 10.6 | 13.1 | 11.8 |
| Formaldehyde emission [mg/100 g] | 4.4 | 1.3 | 1.3 |

We claim:

1. Heat curing bonding agent composition comprising tannin of pine bark and/or pecan nut, paraformaldehyde and an ammonium salt of a weak acid.

2. Bonding agent composition as claimed in claim 1, characterized in that it comprises additionally mimosa and/or quebracho tannin.

3. Bonding agent composition as claimed in claim 1, characterized in that it comprises 70 to 93 wt % tannin 3 to 10 wt % paraformaldehyde and 4 to 20 wt % of an ammonium salt of a weak acid.

4. Bonding agent composition as claimed in claim 1, characterized in that the ammonium salt of a weak acid is ammonium acetate.

5. Process for the production of particle board by spraying the dry chips with an aqueous bonding agent solution and subsequent shaping, molding and curing of the bonding agent at increased temperature, characterized in that as the bonding agent a composition is used which comprises tannin of pine bark and/or pecan nut, paraformaldehyde and an ammonium salt of a weak acid.

6. A derived timber product wherein the bonding agent composition is that of claim 1.

7. A cellulose containing insulating material containing a bonding agent of claim 1.

8. A particle board containing the bonding agent composition of claim 1.

* * * * *